United States Patent
da Silva et al.

(10) Patent No.: US 12,271,475 B2
(45) Date of Patent: Apr. 8, 2025

(54) DELAYED INFERENCE ATTACK DETECTION FOR IMAGE SEGMENTATION-BASED VIDEO SURVEILLANCE APPLICATIONS

(71) Applicant: Dell Products L.P., Round Rock, TX (US)

(72) Inventors: Pablo Nascimento da Silva, Niterói (BR); Hugo de Oliveira Barbalho, Rio de Janeiro (BR); Roberto Nery Stelling Neto, Rio de Janeiro (BR)

(73) Assignee: Dell Products L.P., Round Rock, TX (US)

( * ) Notice: Subject to any disclaimer, the term of this patent is extended or adjusted under 35 U.S.C. 154(b) by 203 days.

(21) Appl. No.: 17/937,917

(22) Filed: Oct. 4, 2022

(65) Prior Publication Data

US 2024/0111868 A1 Apr. 4, 2024

(51) Int. Cl.
| | |
|---|---|
| *G06F 21/56* | (2013.01) |
| *G06F 21/55* | (2013.01) |
| *G06V 10/764* | (2022.01) |
| *G06V 10/776* | (2022.01) |
| *G06V 20/40* | (2022.01) |
| *G06V 20/52* | (2022.01) |

(52) U.S. Cl.
CPC ......... *G06F 21/566* (2013.01); *G06F 21/554* (2013.01); *G06V 10/764* (2022.01); *G06V 10/776* (2022.01); *G06V 20/49* (2022.01); *G06V 20/52* (2022.01); *G06F 2221/034* (2013.01)

(58) Field of Classification Search
CPC ................. G06F 21/566; G06F 21/554; G06F 2221/034; G06V 10/764; G06V 10/776; G06V 20/49; G06V 20/52; G06V 10/82
See application file for complete search history.

(56) References Cited

U.S. PATENT DOCUMENTS

| | | | |
|---|---|---|---|
| 2007/0113031 A1* | 5/2007 | Brown | G06F 12/123 711/160 |
| 2019/0197236 A1* | 6/2019 | Niculescu-Mizil | G06F 21/554 |
| 2020/0104498 A1* | 4/2020 | Smith | G06N 20/20 |
| 2021/0319232 A1* | 10/2021 | Perazzi | G06N 3/08 |
| 2021/0344690 A1* | 11/2021 | Sharifi Mehr | G06F 16/25 |
| 2022/0006818 A1* | 1/2022 | Cunningham | H04L 63/14 |
| 2022/0114259 A1* | 4/2022 | Ludwig | G06F 21/577 |
| 2022/0121429 A1* | 4/2022 | Haile | G06N 3/08 |

(Continued)

OTHER PUBLICATIONS

Wang, B., Yao, Y., Viswanath, B., Zheng, H. and Zhao, B.Y., 2018, "With Great Training Comes Great Vulnerability: Practical Attacks against Transfer Learning," In 27th USENIX Security Symposium (pp. 1281-1297).

*Primary Examiner* — Daniel B Potratz
*Assistant Examiner* — Taylor P Vu
(74) *Attorney, Agent, or Firm* — Workman Nydegger (57) ABSTRACT

One example method includes dynamically monitoring a stream of image portions that have been classified by a segmentation model of a video surveillance system, evaluating the image portions, based on the evaluating, determining that an attack on the video surveillance system is occurring, or has occurred, and implementing, or causing the implementation of, a remedial action with regard to the attack. The image portions may be image portions that have been classified by a segmentation model.

12 Claims, 6 Drawing Sheets

(56) References Cited

U.S. PATENT DOCUMENTS

| | | | |
|---|---|---|---|
| 2022/0138506 A1* | 5/2022 | Elenes | G06F 18/2148 |
| | | | 382/157 |
| 2022/0342990 A1* | 10/2022 | Zhang | G06F 21/562 |
| 2023/0085927 A1* | 3/2023 | Xu | G06V 10/82 |
| | | | 382/156 |
| 2023/0132330 A1* | 4/2023 | de Oliveira Barbalho | |
| | | | G06N 3/08 |
| | | | 706/15 |
| 2023/0196067 A1* | 6/2023 | Wang | G06N 3/045 |
| | | | 706/20 |
| 2023/0281959 A1* | 9/2023 | Hoshen | G06N 3/045 |
| | | | 382/225 |
| 2023/0401830 A1* | 12/2023 | He | G06N 3/0464 |

* cited by examiner

DELAYED INFERENCE ATTACK DETECTION FOR IMAGE SEGMENTATION-BASED VIDEO SURVEILLANCE APPLICATIONS

FIELD OF THE INVENTION

Embodiments of the present invention generally relate to video surveillance. More particularly, at least some embodiments of the invention relate to systems, hardware, software, computer-readable media, and methods, for detecting attacks on video surveillance systems.

BACKGROUND

While video surveillance systems have proven useful in a variety of contexts, they can be vulnerable to attack by bad actors. For example, traditional Deep Neural Network (DNN) models designed for image segmentation in video surveillance systems are vulnerable to attacks that create small perturbations in the input image to fool the image segmentation. Further, video surveillance applications that rely on image segmentation DNN models are sensitive to attacks that keep predicting the same output for an extended time. As a final example, video surveillance systems that rely on models trained with transfer learning may require extra protection since parts of the model are publicly available and these public parts may be used by attackers to harm the system that is using the model.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Embodiments of the present invention generally relate to video surveillance. More particularly, at least some embodiments of the invention relate to systems, hardware, software, computer-readable media, and methods, for detecting attacks on video surveillance systems. Some embodiments may be particularly well suited for use in connection with video surveillance systems that employ a pre-trained model that has been subjected to a transfer learning process.

In general, some embodiments of the invention comprise a method for detecting attacks to image segmentation models applied to videos. An embodiment of the method may be based on dynamic monitoring of the output of the image segmentation model during a specific time, and performing an intelligent analysis of the predictions to identify attacks. Once the attack is detected, the system may trigger an alert to the system owner to take the appropriate corrective measures. Implementation of the method may involve various components, example embodiments of which will now be briefly described.

In particular, an embodiment may comprise an adversarial image generator to train a discriminator that distinguishes genuine from malicious images to delayed inference attack. An embodiment may comprise a dynamic monitoring method to detect if the application is under attack. Further, an embodiment may comprise a detection procedure that is susceptible to an imperfect discriminator, that is, the detection procedure accepts that the discriminator is not perfect.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, an embodiment of the invention may operate to detect attacks on a model that was trained with transfer learning. An embodiment may operate to detect attacks on a model that relies on image segmentation for image classification. An embodiment may respond to changes by dynamically updating, over time, the model classifications, or predictions. Various other advantages of one or more embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Context

This section presents some context for some example embodiments. Example contextual elements include transfer learning and mimicking attacks for transfer learning.

A.1 Transfer Learning

Deep Neural Networks (DNNs) have been widely and successfully employed in various applications, such as image classification, speech recognition, and image segmentation. Training a deep neural network model is both time-consuming and data-intensive. In many applications, these traits often make the training of a model from scratch impractical. In these cases, transfer learning may be used to overcome these issues.

In general, Transfer Learning (TL) is a machine learning research area with special emphasis on building useful models for a task by reusing a model from a similar, but distinct, task or from the same task but with different data distribution. In practice, some well-tuned and intricate centralized models, sometimes referred to as 'Teacher' models and pre-trained with large datasets, are shared on public platforms. Then, individual users adapt those Teacher models and further customize them to create accurate models for specific tasks, that is, 'Student' models. One approach to performing transfer learning in deep learning is using the pre-trained model as a starting point, and then fine-tuning the model for a specific task. The fine-tuning may be performed until the student model achieves a good accuracy using only minimal, and limited, training data.

As might be expected, the centralized nature of transfer learning makes it vulnerable and, thus, an attractive target for attackers. Typical Teacher models are hosted and maintained on popular platforms, such as Azure, Aws, Google Cloud, and GitHub, and access to these models is publicly available. So, since the highly tuned centralized model is publicly available, an attacker could explore that characteristic to create adversarial examples to fool the model, thus creating security problems for any student models derived from the teacher model. It is important to point out that the adversarial examples may fool both the teacher model, and the derived student models. In fact, a study in this field evaluated many models available at the cloud provider machine learning platforms and concluded that there are relevant vulnerabilities when using publicly image classification models and transfer learning.

A.2 Mimicking Attacks

A mimicking attack is designed to be an attack on transfer learning. In one study (Wang, B., Yao, Y., Viswanath, B., Zheng, H. and Zhao, B. Y., 2018. *With great training comes great vulnerability: Practical attacks against transfer learning*. In 27th {USENIX} Security Symposium ({USENIX} Security 18) (pp. 1281-1297) ("Wang")) (incorporated herein in its entirety by this reference), the authors assume white-box access to a Teacher model T, that is, there access is available to the internals of the neural network, and black-box access to a Student model S derived from that Teacher model, that is, there is no access to the internals of the neural network of the student model, but the query is still possible. In this type of attack, the attacker knows that S was trained using T as a teacher, and the attacker also knows which layers were frozen during the student training. Recall that, in transfer learning, student models customize deep layers of a teacher DNN model to a related task or same task but with a different domain.

Thus, an important insight of the mimicking attack is that, in feedforward neural networks, which may be employed in teacher/student models, each layer can only observe what is passed on to it from the previous layer. Thus, suppose that an adversarial sample, such as a perturbed image for example, has an internal representation at a layer K that perfectly matches the target image internal representation at layer K. In that case, the adversarial sample will be misclassified into the same label as the target image, regardless of the weights of any layers that follow K.

Figure 1:
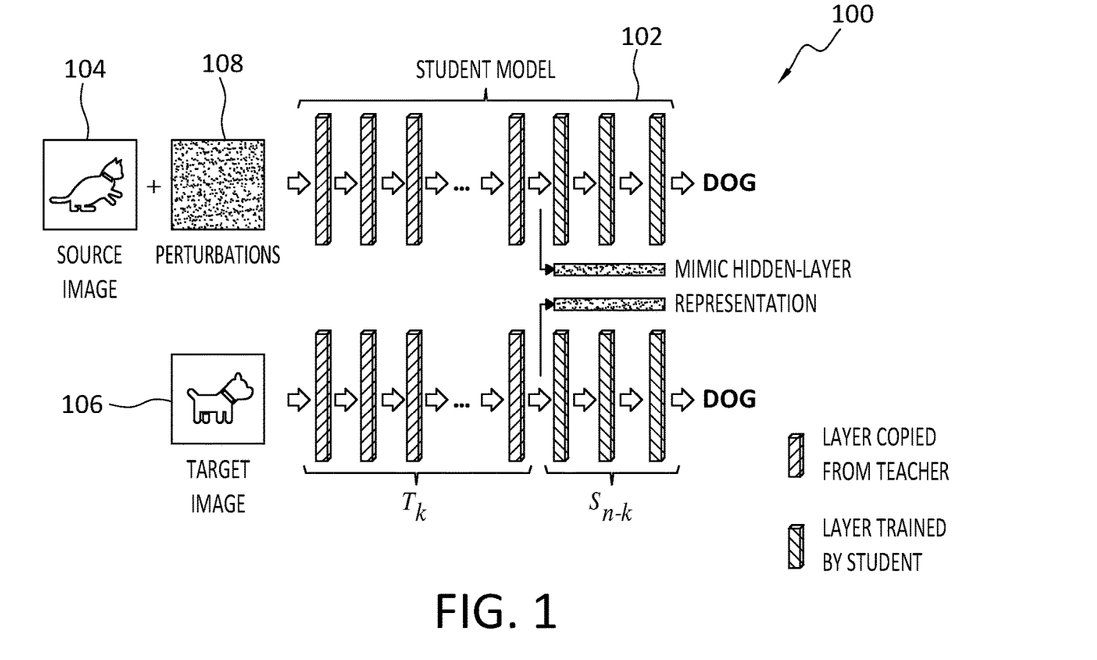
FIG. 1 discloses aspects of an example mimicking attack.

FIG. 1 illustrates an example 100 of a mimicking attack. In this example, the attacker aims to fool the DNN 102 into classifying a cat image, source image 104, as if it were a dog image, target image 106. To do so, the attacker produces a perturbation 108 in the source image 104 to mimic the target output image 106 of the Kth hidden layer. This perturbation may be computed by solving the following optimization problem:

$$\min D(T_K(x'_s), T_K(x_t))$$

$$\text{s. t. } d(x'_s, x_s) < P.$$

The above optimization minimizes dissimilarity D(.) between the two outputs of the Kth hidden layer, that is, the dissimilarity between the perturbed image 104 and the target image 106, under a constraint to limit perturbation within a budget P. To compute D(.), Wang suggests using L2 distance, and to compute d(.), Wang suggests the DSSIM metric. The underlying notion here is that humans are sensitive to structural changes in an image, which strongly correlates with their subjective evaluation of image quality. To infer structural changes, DSSIM captures patterns in pixel intensities, especially among neighboring pixels.

To solve this optimization problem, Wang suggests the penalty method to reformulate the optimization problem as follows:

$$\min D(T_K(x'_s), T_K(x_t)) + \lambda (\max(d(x'_s, x_s) - P, 0))^2$$

where λ is a penalty coefficient that controls the tightness of the privacy budget constraint. In connection with some example embodiments of the invention, the inventors solved this optimization problem using the Adadelta optimizer implemented in Pytorch.

B. Overview

There has been an increase in deep learning models that require enormous amounts of data and computational resources for training. Offering services for fine-tuning pre-trained models using a transfer learning method has been primarily publicized as the solution for the lack of data and computational resources in the training of deep learning models. However, the centralized nature of transfer learning makes it an attractive and vulnerable target for attackers since the pre-trained models are usually publicly available or easily accessible. Thus, some embodiments of the invention comprise a method for detecting attacks of a model trained with transfer learning on video surveillance applications, such as industrial image surveillance for example. This method may have many applications, such as in the deployment of industrial image surveillance inside production lines in factories, or in the identification of persons seen by a security camera, for example.

An attacker can produce an input to the image that can fool the neural network model, causing many problems to the underlying system. For example, it is understood that on a security camera performing image segmentation, the inability, due to an attack, to identify invasion to an area is extremely dangerous to the application. Some modern attacks can generate images similar to the original but producing a completely different prediction when passed through the neural network. Or, in a more straightforward sense, an attacker can create a specific image tag that induces the neural network to produce incorrect predictions.

Thus, some example embodiments of the invention comprise methods for identifying and preventing such attacks.

Using a pre-trained model to train machine learning models in a transfer learning setting exposes AI/ML-based applications to vulnerabilities. Thus, some embodiments are concerned with the following problems: (1) traditional DNN (Deep Neural Network) models designed for image segmentation are vulnerable to attacks that create small perturbations in the input image to fool the image segmentation workflow; (2) video surveillance applications that rely on image segmentation DNN models are sensitive to attacks that keep predicting the same output for an extended period of time; and (3) a delayed inference attack is characterized by a burst of adversarial images that can harm the application in a specific time window without being noticed.

In light of concerns such as these, some embodiments comprise a method for detecting attacks to image segmentation models applied to videos to tackle these problems. An embodiment of the method is based on dynamic monitoring of the output of the image segmentation model during a specific time, performing an intelligent analysis of the predictions to identify attacks. Once the attack is detected, the system triggers an alert to the system owner to take the appropriate corrective measures. According to some embodiments, various components may be employed to implement aspects of such a method. Such components may include, for example, an adversarial image generator to train a discriminator that distinguishes genuine from malicious images to delayed inference attack; a dynamic monitoring method to detect if the application is under attack; and, a detection procedure that is susceptible to an imperfect discriminator, that is, accepts that the discriminator is not perfect.

Note that, in some embodiments, a segmentation model may assign a class to each unit, such as pixel for example, of an image, although a class may be assigned at coarser levels than a pixel. This assignment of classes is an example of a segmentation process. The classified pixels, or other classified portions of an image, may be referred to as segments. These classified segments may be evaluated by a discriminator, as disclosed in more detail elsewhere herein.

C. Detailed Aspects of Some Embodiments

Some embodiments of the invention comprise a method based on dynamic monitoring of the output of the image segmentation model during a specific time duration, performing an intelligent analysis of the predictions in the stream to identify whether a model has been attacked. In a proactive scenario, some embodiments may deploy countermeasures to avoid any harm to the system. Some embodiments take into consideration that the model segmentation used in the system, such as a video surveillance system for example, may have been previously trained with transfer learning, that is, parts of the model were/are publicly available and may have been accessed and used by an attacker. As discussed in detail below, some embodiments comprise a method that may include various components, such as: discriminator training; dynamic monitoring; and rolling-window management.

Figure 2:
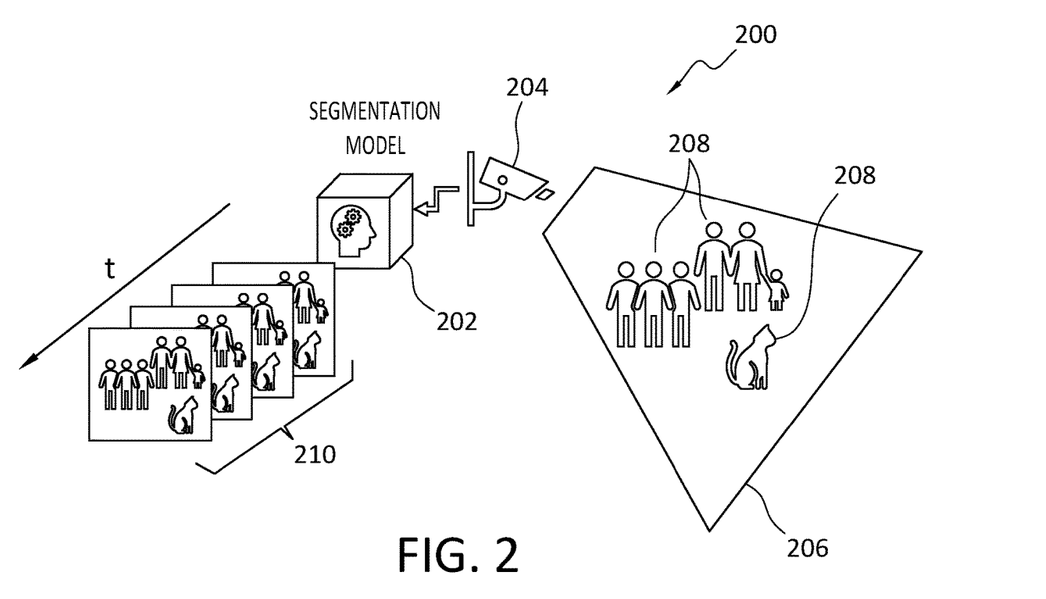
FIG. 2 discloses aspects of an image segmentation model being applied to image surveillance.

With brief reference to the configuration 200 of FIG. 2, there is disclosed an example of an image segmentation model 202 being employed in an image surveillance system 204 context. In brief, the image surveillance system 204 may capture one or more images 206 of subjects 208, which may comprise humans for example. The captured images 206 are passed to the segmentation model 202 for classification. The segmentation model 202 may compare the captured images with known images and information and, based on the comparison, determine whether or not the captured images 206 can be classified as belonging to a particular group, or class. To illustrate, the captured image 206 of a cat may be classified as belonging to the class or group 'animals.' Thus, the segmentation model 202 may operate, over time, to generate classifications 210 of captured images 206. The segmentation model 202 may flag unknown images, that is, images that cannot be classified in any known class, as 'unknown.' Another example classification that may be employed is 'authorized' or 'not authorized' to classify humans, whose image has been captured, as authorized or not to be on the premises that is being monitored by the image surveillance system 204.

Figure 3:
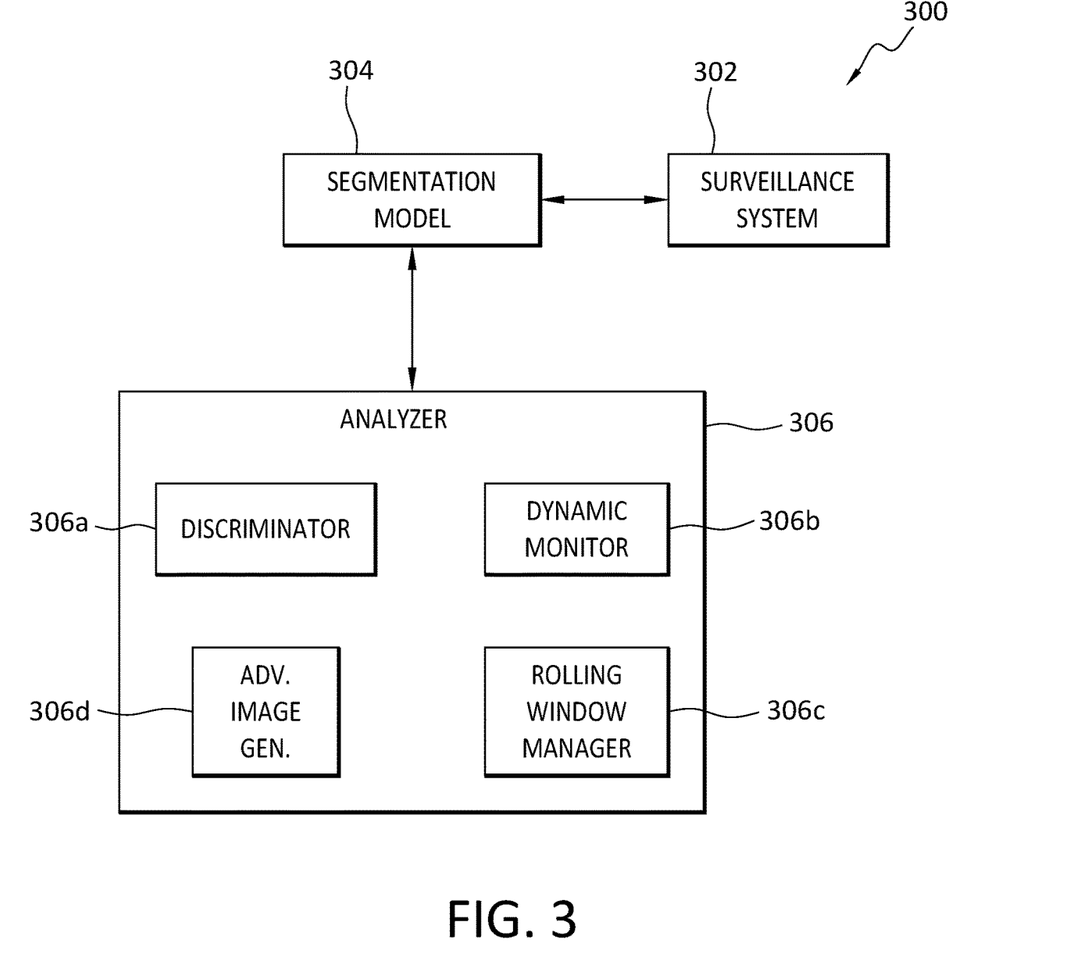
FIG. 3 discloses aspects of an example architecture.

With attention now to FIG. 3, details are provided concerning a basic architecture 300 for some embodiments. The architecture 300 may comprise one or more surveillance systems 302 that may comprise still cameras and/or video cameras, or any other image capturing device(s). The images, which may be digital and/or analog, may be captured in color, and/or in black-and-white. Images generated by the surveillance system 302 may be stored locally at the surveillance system 302 and/or elsewhere, and may be passed to a segmentation model 304. As briefly noted above, and described in more detail below, the segmentation model 304 may, among other things, classify images generated by the surveillance system 302. The segmentation model 304 may or may not be integrated together with the surveillance system 302.

Finally, and as described in more detail below, an analyzer 306 may communicate with the segmentation model 304 and may operate to detect, stop, and/or prevent, attacks on the segmentation model 304. The analyzer 306 may or may not be integrated together with the segmentation model 304 and/or with the surveillance system 302.

In an embodiment, the analyzer 306 may comprise various components, which may take the form of respective modules, such as a discriminator 306a, a dynamic monitor 306b, a rolling window manager 306c, and an adversarial image generator 306d. Example functions for these elements are discussed below. In general however, it is noted that some embodiments may involve the use of two different models. The segmentation model 304 may operate to classify images captured by a surveillance system 302, and the discriminator 306a may then evaluate whether or not the images/classifications received from the segmentation model 304 exhibit any characteristics of an attack.

C.1 Discriminator Training

Some embodiments may involve construction of a machine learning model, which may be referred to herein as a 'discriminator,' that is operable to classify whether an image, received from an image segmentation model for example, is from the current domain, or if the image has some signal or indication of a perturbation characteristic of an attack on a surveillance system that the image segmentation model is associated with. To build this discriminator, data may be collected from the application domain, for example, images may be collected from the surveillance system, and the collected data may then be stored in a server to be processed. The server may comprise, for example, an analyzer such as the analyzer 306 discussed in connection with FIG. 3. In an embodiment, the data collected may be diverse, with image captures from different time frames, different visual perspectives, various weather conditions—such as if the system runs on an open field outside, time of the day, objects, and a mix of events happening in the environment from which the images are captured.

After the data collection, the teacher model, upon which the deployed segmentation model may be based, may be obtained. This teacher model, because it has been publicly available and may have been accessed by adversaries, may be used to generate various adversarial images.

Next, the possible attacks that the system wants to avoid may be identified and collected. With this information, a new dataset of images may be generated using a collection of potential attacks, such as the mimicking attack described earlier. These new images may be generated by adding noise to the original image, noise which was created from the collection of attacks. This noise may be added, for example, by an adversarial image generator, such as the adversarial image generator 306d for example. In this way, new images may be created that are the same as, or materially similar to, images that may be expected to be generated by an attack.

The new images in this dataset may be assigned the label 'noise,' and the images collected in the original dataset may be assigned the label 'conformant.' The discriminator may then be trained to differentiate between the images and classify the images as either 'noise' or 'conformant'. At the end of the discriminator training, the discriminator performance, or false positive rate, may be recorded. As explained below, this performance metric may be used in a rolling window management phase of some embodiments to determine if there is potential attack, or an actual attack taking place.

C.2 Dynamic Monitoring

Figure 4:
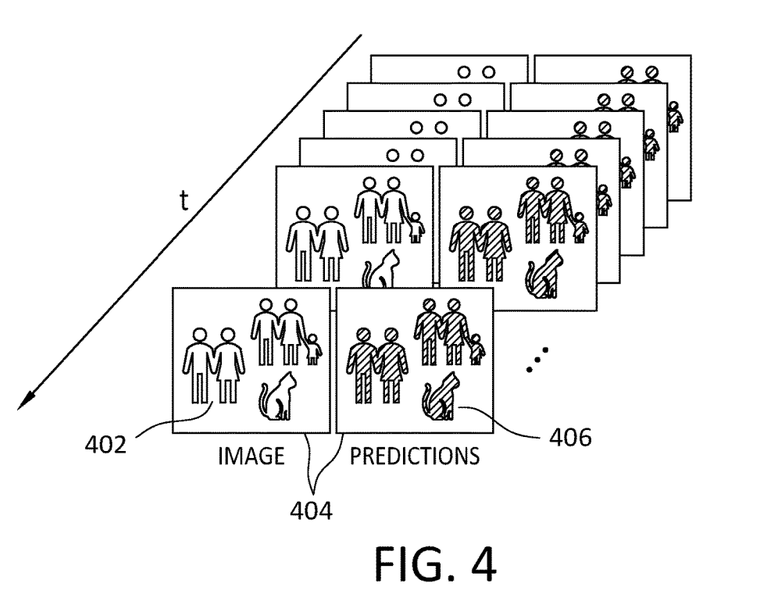
FIG. 4 discloses aspects of a dynamic monitoring process.

A dynamic monitor, or dynamic monitoring system, according to some embodiments, may operate to update a list of predictions, that is image classifications generated by a segmentation model. This updating may be performed from time to time, such as on a rolling window basis for example. For example, FIG. 4 discloses an example where a dynamic monitoring process operates to correlate group predictions, or classifications, to their original images, and then temporally groups the images/predictions. Particularly, and as shown in FIG. 4, an embodiment may, over a period of time, separate the observed images 402 in real-time consecutive frames 404 and then store a corresponding prediction 406, or classification, for each observed image inside each frame 404. Note that, as discussed hereafter, a frame and window may define respective discrete periods of time.

C.3 Rolling Window Management

Some embodiments may comprise a rolling window management module and process. This part of the system manages the rolling windows and identifies when a malfunction is detected. In general, the rolling window management process may help to ensure that images generated by the surveillance system are being evaluated on an ongoing basis, and to help ensure that those images are being evaluated in a timely manner. Finally, the rolling window process may, through use of the counters disclosed herein, help to identify when an attack started/ended, the duration of the attack, and the intensity of the attack. For example, a situation where 'noise'>>>>'conformant' may suggest a relatively more intense attack as compared with a situation where 'noise'>'conformant.' Further, the first point at which 'noise' becomes>'conformant' may be deemed, in some circumstances, as the start of an attack.

An embodiment of the rolling window management method may comprise the following operations:
1. split a time window into h time frames w of size a each;
2. create a linked list of a defined size b where the head corresponds to the current time frame, and the tail is the oldest time frame;
3. predict the probability of each image in the time frame w as either a 'noise' image or a 'conformant' image using the discriminator;
4. every time frame $w_i$ stores a respective counter of 'conformant' classifications and another counter of 'noise' classifications, that is, possible attacked images, embraced by the time frame—a new head is appended to the linked list when the then-current head times out, and the tail is removed from the linked list when its time frame becomes older than the time window size;
5. the information gathered (in 3.) may be used to generate or define a global counter of conformant time frames and another global counter of noisy time frames—a time frame may be considered noise or conformant according to some pre-defined rules—some embodiments may employ simple majority voting, but any other type of voting or criteria could be used;
6. one or both of the global counters may be updated when a counter of the current time frame is updated, or the tail is removed from the linked list; and,
7. an alert of attack may be triggered whenever the global percentage of adversarial classification is greater than the discriminator error threshold, as recorded in the discriminator training (see, C.1)—in this case, some embodiments may apply counter measurements in response to a detected, or potential, attack, such as a switch to a different image segmentation model or trigger a re-training procedure.

Figure 5:
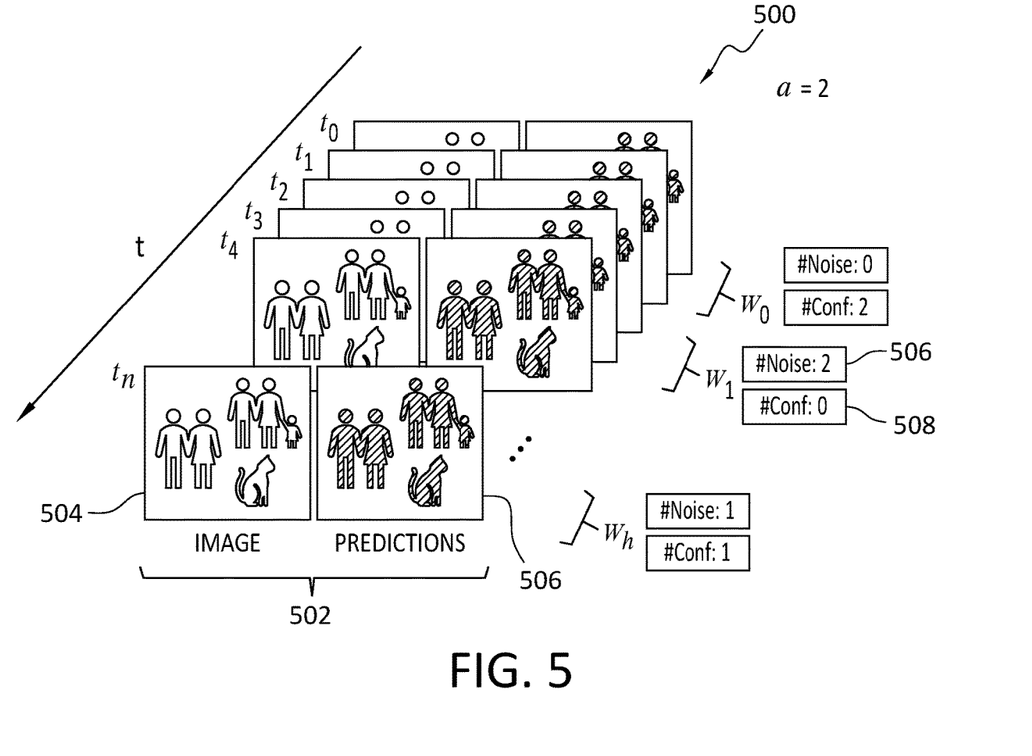
FIG. 5 discloses a representation of a data structure for storing images and corresponding segmentations.

With the foregoing in view, reference is made now to FIG. 5, which discloses a representation 500 of the internal data structure 502 stored for each one of the time frames w. Each time frame w may comprise a respective group of images 504 with their respective corresponding image segmentations generated by a segmentation model. Each frame w may also store a respective count 506 and 508 of the (1) noise and (2) conformant images inside the time frame. This structure may used to update the global counts of noise and conformant images, and the linked list of processing frames.

Figure 6:
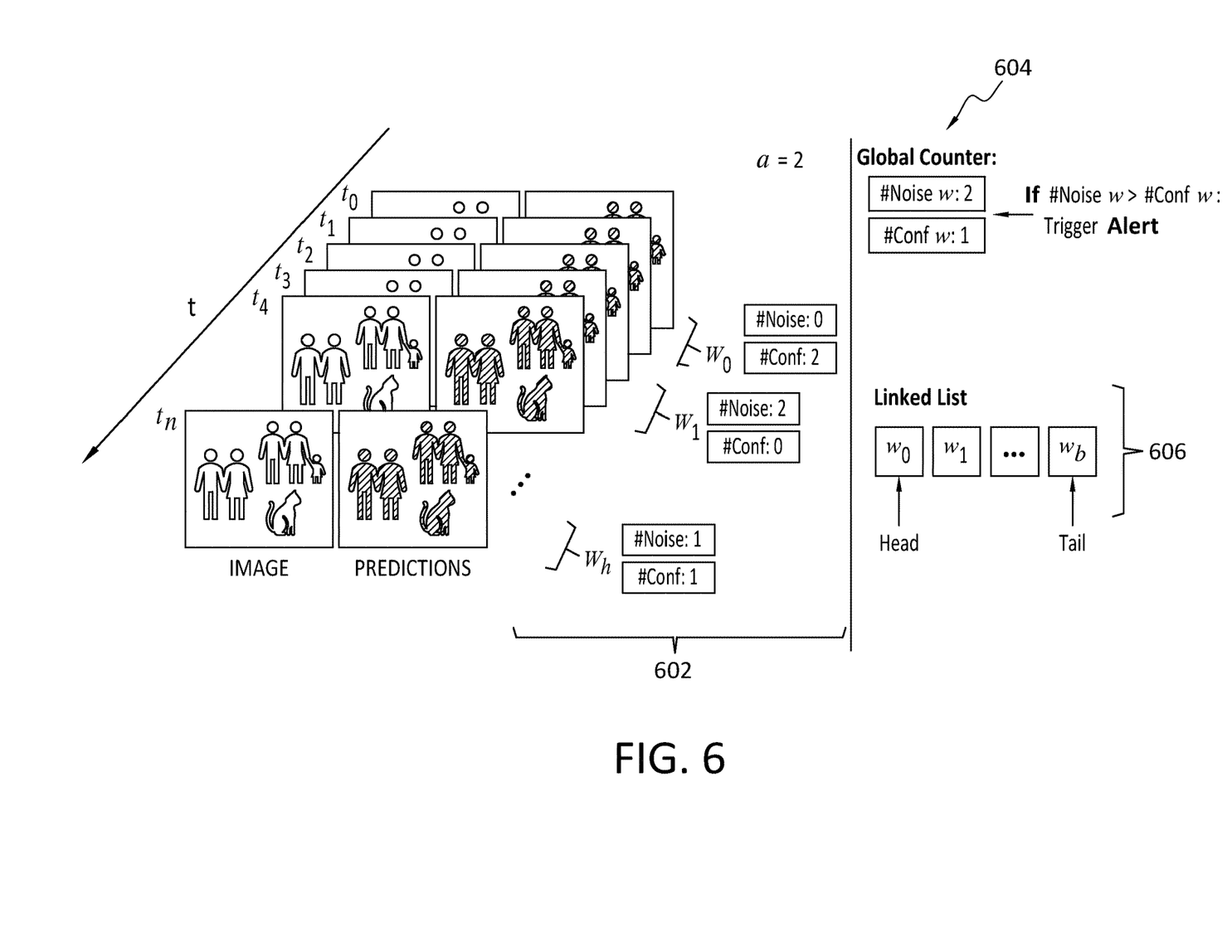
FIG. 6 discloses an example of a global counter configuration.

Reference is next made to FIG. 6, which discloses a global view of the global counter procedure and the linked list with the current processing time frames. As disclosed in FIG. 6, the respective noise and conformant counts of each time frame w 602 may be summed by a global counter 604. Both of those counts may be obtained from the time frames w that are included in the linked list 606.

D. Further Discussion

As will be apparent from this disclosure, some embodiments may possess various useful aspects and features. For example, an embodiment may comprise a method based on dynamic monitoring of the output of an image segmentation model during a specific time, and performing an intelligent analysis of the predictions in the stream to identify whether a model has been attacked.

An embodiment may comprise an adversarial image generator operable to train a discriminator that distinguishes genuine from adversarial images to delayed inference attack. An embodiment may comprise an attack detection method that is compatible, that is, operable in connection with, a flawed image discriminator to identify an attack, notwithstanding some flaws or errors in the discriminator. Finally, an embodiment may comprise a method that dynamically monitors a discriminator output to detect, within a rolling window, if the segmentation model is under attack.

E. Example Methods

Figure 7:
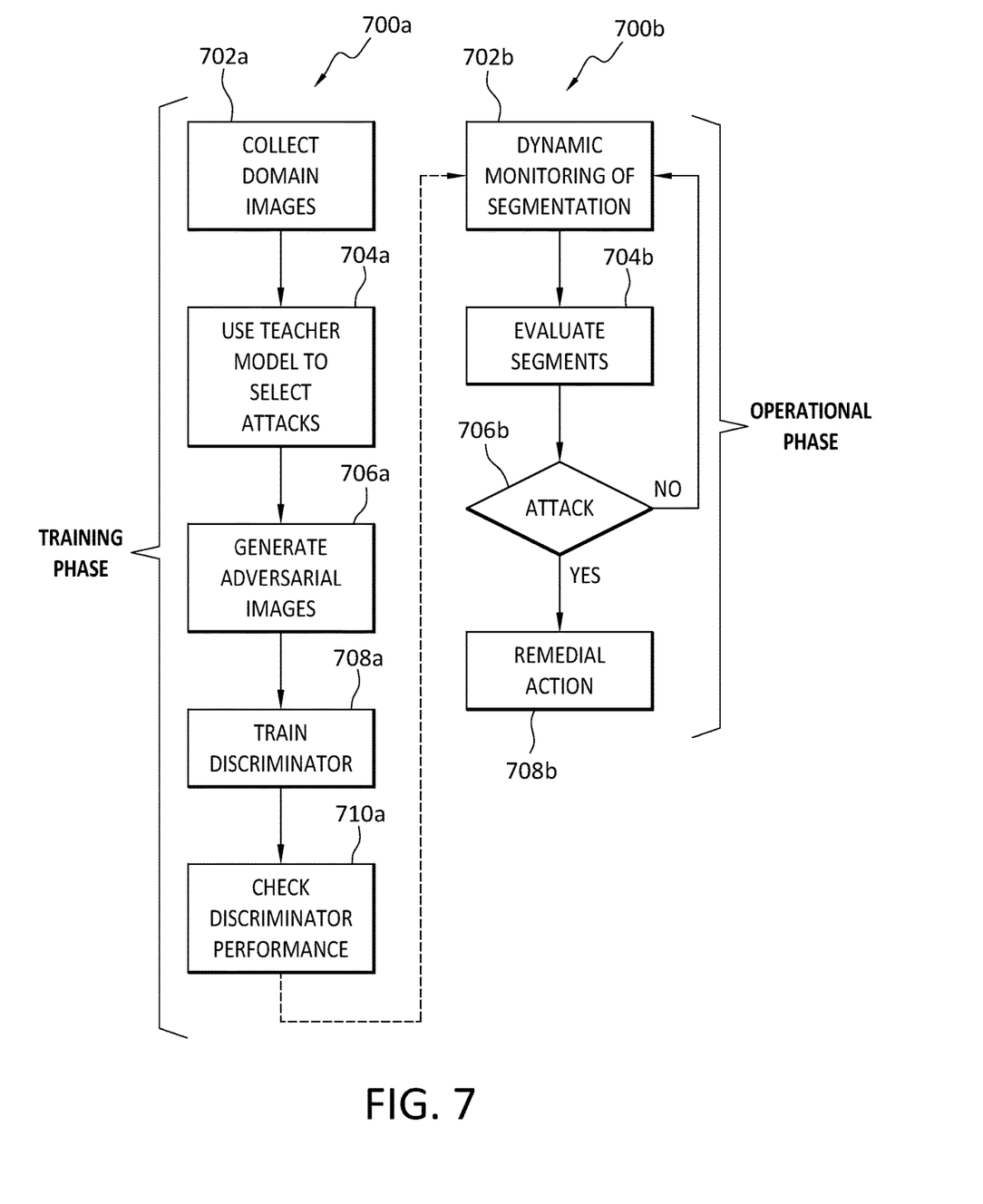
FIG. 7 discloses aspects of example methods according to some embodiments.

It is noted with respect to the disclosed methods, including the example method of FIG. 7, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 7, a method, according to some embodiments, is disclosed that may have multiple phases. In an embodiment, each phase may be performed separately at respective, non-overlapping, times such that one phase may be performed entirely before another phase is begun. Alternatively, in an embodiment, performance of the phases may overlap in time, that is, part of one phase may be performed while part of another phase is ongoing. Further, in an embodiment, a phase may be performed on a one-time only basis, or a phase may be performed on an ongoing basis.

As shown in FIG. 7, a training phase method 700a may begin with the collection 702a of domain images, that is, images from a domain where a system, such as a video surveillance system, operates or is expected to operate. Next, a teacher model, from which a surveillance system segmentation model may have been derived, may be used to select 704a one or more attacks that are considered likely to be directed at the surveillance system. Note that in some embodiments, the domain images may be collected after the teacher model is used to select attacks, rather than before, as shown in FIG. 7.

Once the potential attacks have been identified, then adversarial images may be generated 706a. In general, the adversarial images are the same as, or materially similar to, the images expected to be generated as a result of an attack. The adversarial images may then be used to train 708a a discriminator so that the discriminator is able to distinguish between adversarial images and legitimate images.

Finally, the performance of the trained discriminator may be checked 710a. If the performance does not fall within accepted parameters, the discriminator may be retrained, and/or modified, as needed to exhibit acceptable performance. In some embodiments, completion of the operation 710a may signal the end of a training phase.

At some point after, or possibly before, completion of the training phase 700a, an online, or operational, phase 700b may commence. In general, the operational phase 700b may use the trained discriminator to examine, and classify, segmentations generated by the segmentation model of the surveillance system.

Thus, the operational phase 700b may begin with the dynamic monitoring 702b of segmentations generated by the segmentation model. The monitoring may be dynamic in the sense that it is performed on a rolling window basis for a stream of segmentations received from the segmentation model.

The segmentations received from the segmentation model may then be evaluated 704b. Such evaluation may comprise, for example, identifying segments, of an image that has been classified by the segmentation model, as either 'noise' or 'conformant.'

At some point, a determination 706b may be made as to whether or not, for example, enough segments within a time period have been identified as noise. If so, the determination 706b may be that an attack has taken place, or is in progress. In that case, appropriate remedial action may be taken 708b to stop the attack and/or prevent future attacks. If the determination 706b indicates that no attack has taken place or is in progress, the method 700b may return to 702b.

F. Further Example Embodiments

Following are some further example embodiments of the invention. These are presented only by way of example and are not intended to limit the scope of the invention in any way.

Embodiment 1. A method, comprising: dynamically monitoring a stream of image portions that have been classified by a segmentation model of a video surveillance system; evaluating the image portions; based on the evaluating, determining that an attack on the video surveillance system is occurring, or has occurred; and implementing, or causing the implementation of, a remedial action with regard to the attack.

Embodiment 2. The method as recited in embodiment 1, wherein the image portions comprise segments.

Embodiment 3. The method as recited in any of embodiments 1-2, wherein the evaluating comprises classifying each of the image portions as either 'noise' or 'conformant.'

Embodiment 4. The method as recited in any of embodiments 1-3, wherein the image portions are evaluated on a rolling window basis.

Embodiment 5. The method as recited in any of embodiments 1-4, wherein determining that the attack has occurred, or is occurring, is based on a determination that a threshold number of image portions have been classified, as part of the evaluating, as 'noise.'

Embodiment 6. The method as recited in any of embodiments 1-5, wherein the evaluating is performed by a discriminator that has been trained using domain images, and using adversarial images characteristic of the attack.

Embodiment 7. The method as recited in any of embodiments 1-6, wherein the dynamic monitoring comprises separating the image portions observed by the video surveillance system, and storing in respective frames, the image portion and a classification generated for that image portion by the segmentation model.

Embodiment 8. The method as recited in embodiment 7, where the frames collectively define a time window, and the time window is one of a group of time windows that together form a linked list having a head and a tail.

Embodiment 9. The method as recited in any of embodiments 1-8, wherein the evaluating of the image portions is performed on a time window basis.

Embodiment 10. The method as recited in any of embodiments 1-9, wherein the image segmentation model comprises a student model that was derived from a publicly accessible teacher model.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

G. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 8:
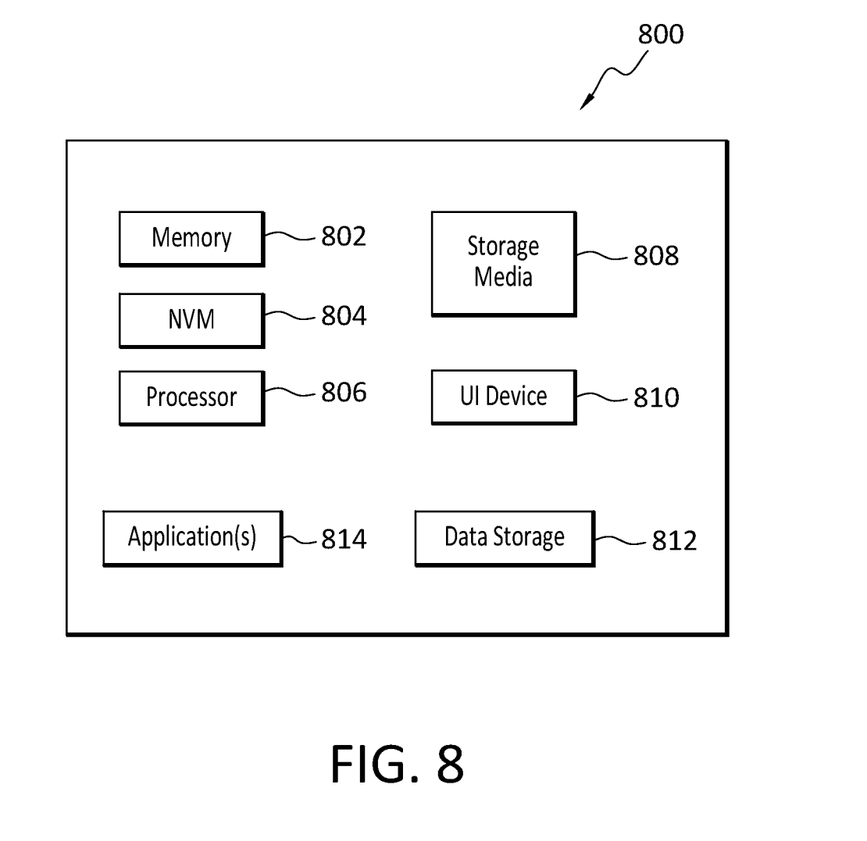
FIG. 8 discloses aspects of an example computing entity operable to perform any of the disclosed methods, processes, and operations.

With reference briefly now to FIG. 8, any one or more of the entities disclosed, or implied, by FIGS. 1-7 and/or elsewhere herein, may take the form of, or include, or be implemented on, or hosted by, a physical computing device, one example of which is denoted at 800. As well, where any of the aforementioned elements comprise or consist of a virtual machine (VM), that VM may constitute a virtualization of any combination of the physical components disclosed in FIG. 8.

In the example of FIG. 8, the physical computing device 800 includes a memory 802 which may include one, some, or all, of random access memory (RAM), non-volatile memory (NVM) 804 such as NVRAM for example, read-only memory (ROM), and persistent memory, one or more hardware processors 806, non-transitory storage media 808, UI (user interface) device 810, and data storage 812. One or more of the memory components 802 of the physical computing device 800 may take the form of solid state device (SSD) storage. As well, one or more applications 814 may be provided that comprise instructions executable by one or more hardware processors 806 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:

dynamically monitoring a stream of image portions that have been classified by a segmentation model of a video surveillance system;

evaluating the image portions;

based on the evaluating, determining that an attack on the video surveillance system is occurring, or has occurred; and implementing, or causing the implementation of, a remedial action with regard to the attack, wherein the evaluating comprises classifying each of the image portions as either 'noise' or 'conformant', wherein the image portions are evaluated on a rolling time window basis, the rolling time window basis comprising:

1. splitting a time window into a plurality of time frames;
2. creating a linked list from the plurality of time frames, where a head of the linked list corresponds to a current time frame of the plurality of time frames, and the tail of the linked list is an oldest time frame of the plurality of time frames;
3. predicting a probability of each image portion in the time frame as either a 'noise' image or a 'conformant' image using a discriminator; and
4. for each time frame within the linked list, storing a respective counter of 'conformant' image classifications and another counter of 'noise' image classifications based on the predicted probability.

2. The method as recited in claim 1, wherein the image portions comprise segments.

3. The method as recited in claim 1, wherein determining that the attack has occurred, or is occurring, is based on a determination that a threshold number of image portions have been classified, as part of the evaluating as 'noise'.

4. The method as recited in claim 1, wherein the evaluating is performed by the discriminator that has been trained using domain images, and using adversarial images characteristic of the attack.

5. The method as recited in claim 1, where the time frames collectively define the time window, and the time window is one of a group of time windows that together form the linked list having the head and the tail that are replaced from time to time.

6. The method as recited in claim 1, wherein the image segmentation model comprises a student model that was derived from a publicly accessible teacher model.

7. A non-transitory storage medium having stored therein instructions that are executable by one or more hardware processors to perform operations comprising:

dynamically monitoring a stream of image portions that have been classified by a segmentation model of a video surveillance system;

evaluating the image portions; based on the evaluating, determining that an attack on the video surveillance system is occurring, or has occurred; and implementing, or causing the implementation of, a remedial action with regard to the attack, wherein the evaluating comprises classifying each of the image portions as either 'noise' or 'conformant', wherein the image portions are evaluated on a rolling time window basis, the rolling time window basis, the rolling time window basis comprising:

1. splitting a time window into a plurality of time frames;
2. creating a linked list from the plurality of time frames, where a head of the linked list corresponds to a current time frame of the plurality of time frames, and the tail of the linked list is an oldest time frame of the plurality of time frames;
3. predicting a probability of each image portion in the time frame as either a 'noise' image or a 'conformant' image using a discriminator; and
4. for each time frame within the linked list, storing a respective counter of 'conformant' image classifications and another counter of 'noise' image classifications based on the predicted probability.

8. The non-transitory storage medium as recited in claim 7, wherein the image portions comprise segments.

9. The non-transitory storage medium as recited in claim 7, wherein determining that the attack has occurred, or is occurring, is based on a determination that a threshold number of images portions have been classified, as part of the evaluating as 'noise'.

10. The non-transitory storage medium as recited in claim 7, wherein the evaluating is performed by the discriminator that has been trained using domain images, and using adversarial images characteristic of the attack.

11. The non-transitory storage medium as recited in claim 7, where the time frames collectively define the time window, and the time window is one of a group of time windows that together form the linked list having the head and the tail that are replaced from time to time.

12. The non-transitory storage medium as recited in claim 7, wherein the image segmentation model comprises a student model that was derived from a publicly accessible teacher model.

* * * * *